United States Patent
Engelland et al.

(10) Patent No.: US 7,972,405 B2
(45) Date of Patent: *Jul. 5, 2011

(54) AIR CLEANER ARRANGEMENTS; SERVICEABLE FILTER ELEMENTS; AND, METHODS

(75) Inventors: Randall Allen Engelland, Farmington, MN (US); Thomas Richard Olson, Prior Lake, MN (US); Gary Ray Gillingham, Prior Lake, MN (US); Jim C. Rothman, Burnsville, MN (US); Richard Lawrence Suydam, River Falls, WI (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,909

(22) Filed: Feb. 12, 2010

(65) Prior Publication Data

US 2010/0139629 A1 Jun. 10, 2010

Related U.S. Application Data

(63) Continuation of application No. 10/589,519, filed as application No. PCT/US2005/005104 on Feb. 16, 2005, now Pat. No. 7,682,416.

(60) Provisional application No. 60/545,401, filed on Feb. 17, 2004.

(51) Int. Cl.
*B01D 46/52* (2006.01)

(52) U.S. Cl. ............. 55/521; 55/385.3; 55/480; 55/481; 55/502; 55/506; 123/198 E (58) Field of Classification Search ................. 55/385.3, 55/478, 480, 481, 502, 506, 521; 123/198 E
See application file for complete search history.

(56) References Cited

U.S. PATENT DOCUMENTS

| | | | |
|---|---|---|---|
| 991,572 A | 5/1911 | Weisenstein |
| 2,074,294 A | 11/1935 | Woodruff |
| 2,887,177 A | 5/1959 | Mund et al. |
| 3,025,963 A | 3/1962 | Bauer |
| 3,209,917 A | 10/1965 | Yelinek |
| 3,676,242 A | 7/1972 | Prentice |
| 3,695,437 A | 10/1972 | Shaltis |
| 3,807,150 A | 4/1974 | Maracle |
| 3,841,953 A | 10/1974 | Kohkamp et al. |
| 3,849,241 A | 11/1974 | Butin et al. |
| 3,878,014 A | 4/1975 | Melead |
| 4,018,580 A | 4/1977 | Bürkholz et al. |
| 4,065,341 A | 12/1977 | Cub |

(Continued)

FOREIGN PATENT DOCUMENTS

EP 0 376 443 B1 7/1990

(Continued)

OTHER PUBLICATIONS

Office Action mailed Jun. 2, 2009.

(Continued)

*Primary Examiner* — Robert A Clemente
(74) *Attorney, Agent, or Firm* — Merchant & Gould P.C.

(57) ABSTRACT

An air cleaner arrangement or assembly is provided. The air cleaner arrangement includes a serviceable filter cartridge. The air cleaner assembly also includes an arrangement for positioning the filter cartridge into a preferred, sealing, orientation and for securing the filter cartridge in that location. Preferred serviceable filter cartridges are provided, as well as methods of assembly and use.

17 Claims, 11 Drawing Sheets

U.S. PATENT DOCUMENTS

| | | | |
|---|---|---|---|
| 4,158,449 A | 6/1979 | Sun et al. |
| 4,159,899 A | 7/1979 | Deschenes |
| 4,162,906 A | 7/1979 | Sullivan et al. |
| 4,282,186 A | 8/1981 | Nonnenmann et al. |
| 4,285,909 A | 8/1981 | Mizusawa et al. |
| 4,322,231 A | 3/1982 | Hilzendeger et al. |
| 4,402,830 A | 9/1983 | Pall |
| 4,430,223 A | 2/1984 | Miyakawa et al. |
| 4,449,993 A | 5/1984 | Bergeron |
| 4,537,608 A | 8/1985 | Koslow |
| 4,617,176 A | 10/1986 | Merry |
| 4,704,143 A | 11/1987 | Percy |
| 4,720,292 A | 1/1988 | Engel et al. |
| 4,925,469 A | 5/1990 | Clement et al. |
| 4,925,561 A | 5/1990 | Ishii et al. |
| 4,963,170 A | 10/1990 | Weber et al. |
| 5,030,264 A | 7/1991 | Klotz et al. |
| 5,125,941 A | 6/1992 | Ernst et al. |
| 5,213,596 A | 5/1993 | Kume et al. |
| 5,304,312 A | 4/1994 | Forster et al. |
| 5,350,515 A | 9/1994 | Stark et al. |
| 5,415,677 A | 5/1995 | Ager et al. |
| 5,435,870 A | 7/1995 | Takagaki et al. |
| 5,484,466 A | 1/1996 | Brown et al. |
| 5,487,767 A | 1/1996 | Brown |
| 5,494,497 A | 2/1996 | Lee |
| 5,495,487 A | 2/1996 | Whetsel, Jr. |
| 5,543,007 A | 8/1996 | Takagaki et al. |
| 5,547,480 A | 8/1996 | Coulonvaux |
| 5,569,311 A | 10/1996 | Oda et al. |
| 5,590,695 A | 1/1997 | Siegele et al. |
| 5,611,922 A | 3/1997 | Stene |
| 5,613,992 A | 3/1997 | Engel |
| 5,645,718 A | 7/1997 | Hardison et al. |
| 5,683,660 A | 11/1997 | Wirth et al. |
| 5,685,985 A | 11/1997 | Brown et al. |
| 5,714,126 A | 2/1998 | Frund |
| 5,730,766 A | 3/1998 | Clements |
| 5,730,768 A | 3/1998 | Kaminaga et al. |
| 5,740,774 A | 4/1998 | Kennedy |
| 5,755,843 A | 5/1998 | Sundquist |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| 5,820,646 A | 10/1998 | Gillingham et al. |
| 5,863,313 A | 1/1999 | Coulonvaux |
| 5,897,676 A | 4/1999 | Engel |
| 5,902,364 A | 5/1999 | Tokar et al. |
| 5,951,729 A | 9/1999 | Ernst et al. |
| D417,268 S | 11/1999 | Gillingham |
| 6,007,169 A | 12/1999 | Li et al. |
| 6,048,386 A | 4/2000 | Gillingham et al. |
| D425,189 S | 5/2000 | Gillingham et al. |
| 6,149,700 A | 11/2000 | Morgan et al. |
| 6,179,890 B1 | 1/2001 | Ramos et al. |
| 6,190,432 B1 | 2/2001 | Gieseke et al. |
| 6,231,630 B1 | 5/2001 | Ernst et al. |
| 6,235,195 B1 | 5/2001 | Tokar |
| 6,296,025 B1 | 10/2001 | Gregg et al. |
| 6,299,661 B1 | 10/2001 | Bloomer |
| 6,322,602 B2 | 11/2001 | Engel et al. |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| 6,517,598 B2 | 2/2003 | Anderson et al. |
| 6,572,667 B1 | 6/2003 | Greif et al. |
| 6,585,792 B2 | 7/2003 | Schneider et al. |
| 6,598,580 B2 | 7/2003 | Baumann et al. |
| 6,610,117 B2 | 8/2003 | Gieseke et al. |
| 6,610,126 B2 | 8/2003 | Xu et al. |
| D483,459 S | 12/2003 | DeWit et al. |
| 6,808,547 B2 * | 10/2004 | Ota et al. ............ 55/478 |
| 7,004,986 B2 | 2/2006 | Kopec et al. |
| 7,351,270 B2 * | 4/2008 | Engelland et al. ............ 55/502 |
| 7,682,416 B2 * | 3/2010 | Engelland et al. ............ 55/481 |
| 2002/0112458 A1 | 8/2002 | Schneider et al. |
| 2002/0184864 A1 | 12/2002 | Bishop et al. |
| 2002/0185007 A1 | 12/2002 | Xu et al. |
| 2004/0020177 A1 | 2/2004 | Ota et al. |
| 2005/0229561 A1 * | 10/2005 | Nepsund et al. ............ 55/481 |
| 2006/0163150 A1 | 7/2006 | Golden |
| 2008/0250763 A1 | 10/2008 | Widerski |

FOREIGN PATENT DOCUMENTS

| | | |
|---|---|---|
| EP | 0 486 276 B1 | 5/1992 |
| EP | 0 492 250 A1 | 7/1992 |
| EP | 0 529 921 B1 | 3/1993 |
| EP | 0 704 233 B1 | 4/1996 |
| EP | 0897317 | 7/2000 |
| EP | 1 364 695 | 11/2003 |
| EP | 1364695 | 11/2003 |
| FR | 2 034 160 | 12/1970 |
| GB | 703823 | 2/1954 |
| GB | 1275651 | 5/1972 |
| JP | S58-151417 | 3/1982 |
| JP | S60-155921 | 3/1984 |
| JP | 60-112320 | 6/1985 |
| JP | 1-171615 | 12/1987 |
| JP | H02-48117 | 9/1988 |
| JP | H02-48118 | 9/1988 |
| JP | 1-11971 | 1/1989 |
| WO | 97/40918 | 11/1997 |
| WO | WO 97/40908 | 11/1997 |
| WO | WO 97/40910 | 11/1997 |
| WO | 97/45200 | 12/1997 |
| WO | 98/35144 | 8/1998 |
| WO | 99/37381 | 7/1999 |
| WO | 00/74818 | 12/2000 |
| WO | 03/084641 | 10/2003 |
| WO | 03/095068 A1 | 11/2003 |
| WO | WO 03/095068 | 11/2003 |
| WO | 2004/007054 | 1/2004 |
| WO | 2004/020075 A2 | 3/2004 |
| WO | WO 2006/009766 | 1/2006 |

OTHER PUBLICATIONS

Office Action mailed Nov. 20, 2009.

Allowed Claims in U.S. Appl. No. 10/589,519, filed Nov. 11, 2009.

\* cited by examiner

AIR CLEANER ARRANGEMENTS; SERVICEABLE FILTER ELEMENTS; AND, METHODS

The present application is a continuation application of U.S. Ser. No. 10/589,519, filed May 8, 2007 now U.S. Pat. No. 7,682,416 as a U.S. National Stage application of PCT/US2005/005104, filed Feb. 16, 2005, which claims priority to U.S. Ser. No. 60/545,401, filed Feb. 17, 2004. A claim of priority to each of U.S. Ser. No. 10/589,519; PCT/US2005/005104; and 60/545,401 is made to the extent appropriate. Also, each of U.S. Ser. No. 10/589,519; PCT/US2005/005104; and, 60/545,401 is incorporated herein by reference, in its entirety.

TECHNICAL FIELD

This disclosure relates to air cleaners and to components for air cleaners. This disclosure particularly concerns air cleaners of a type useable for cleaning intake air for engines. Methods of assembly and use are also provided.

BACKGROUND

Air cleaners are needed for a variety of applications, for example to provide cleaning of engine intake air for internal combustion engines. A wide variety of types of air cleaner arrangements and filter materials are known.

One known filter material, is filter media configured in a z-arrangement. Z-filter media generally comprises a corrugated or fluted media sheet secured to a facing sheet. The media is arranged to form a set of longitudinal flutes or air flow channels on one side of the corrugated or fluted media, and another set of flow channels on an opposite side of the corrugated or fluted media. In operation, flutes of one set of flutes are designated as inlet flutes, in which individual inlet flutes are left open at an inlet end or side of the media, and are sealed, folded or otherwise closed at an outlet end or side of the media. Analogously, the flutes of a second set of flutes are generally designated as outlet flutes, are sealed, folded or otherwise closed at the inlet end or side of the filter, and are left open at the outlet end or side of the filter. In operation, air passes into one flow face of the air filter construction, by passage into the open inlet flutes at an upstream end of the element. The air cannot flow out of the closed ends of these inlet flutes, so it must pass through the filter media into the outlet flutes. The filtered air then passes outwardly from an exit end of the filter element, through the open ends of the outlet flutes.

A variety of z-filter constructions are known; including, for example, the ones described in U.S. Pat. Nos. 5,820,646; 5,792,247; 6,190,432; and, 6,350,291; PCT Publication WO 97/40918; U.S. provisional application 60/395,009 filed 10 Jul. 2002; and the PCT Application US 03/02799 filed Jan. 31, 2003 and claiming priority from U.S. Provisional 60/395,009; the complete disclosures of all eight references above being incorporated herein by reference. These types of media (among others) can be used in arrangements of the types described herein.

Z-filter media has been characterized as useable in coiled configurations, see for example U.S. Pat. No. 6,350,291; or in stacks of sheets of z-filter media, see for example FIG. 26 of U.S. Pat. No. 5,820,646.

SUMMARY OF THE DISCLOSURE

In the present disclosure, unique features of air filter cartridge arrangements are described and shown. In addition, unique air cleaner arrangement or features, for receiving and mounting the filter cartridge arrangements are provided.

With the various features shown and described, or selected combinations of them, unique and convenient filter cartridges and air cleaner assemblies can be made.

The disclosure also concerns methods of installing air filter cartridges, and methods of removing them. In addition, from the descriptions provided, methods of assembling preferred filter cartridges and preferred air cleaner assemblies will be apparent.

The current disclosure concerns certain preferred arrangements for utilization of z-filter media constructions. Related, by structure, arrangements are described in the U.S. utility application entitled "Air Cleaner Arrangements, Serviceable Filter Elements; and, Methods" filed Feb. 10, 2004 by the inventors Randall Allen Engelland, Thomas Richard Olson, Gary Ray Gillingham, Jim C. Rothman, and Richard Lawrence Suydam, under Express Mail #EL 976593878 US. The complete disclosure of the Feb. 10, 2004 Express Mail #EL 976593878 US filing is incorporated herein by reference. Also, the current disclosure is related, by structure, to the following two U.S. Provisional applications: U.S. 60/446,804 filed Feb. 11, 2003; and 60/457,255, filed Mar. 25, 2003. The complete disclosure of these two provisional applications are incorporated herein by reference.

DETAILED DESCRIPTION

I. FIGS. 1-9

The present disclosure concerns certain air cleaners which use filter elements having a straight through flow design. By the term "straight through flow design," it is meant that air enters a serviceable filter cartridge within the air cleaner, along one (inlet) face, and filtered air exits the filter cartridge from an opposite, second (outlet) face. That is, the inlet and outlet flow paths for the serviceable filter cartridge are generally in the same direction.

As indicated, air cleaners of the type concern that the present disclosure, include serviceable filter elements or cartridges. The term "serviceable filter element or cartridge", and variants thereof, in this context, is meant to refer to a filter element or cartridge that can be removed from the remainder of the air cleaner and be replaced therein. Typically the filter cartridge of an air cleaner for intake air of combustion engines needs to be serviceable, since periodically the filter cartridge will become occluded, and must be removed and be replaced.

Air cleaners and serviceable filter cartridges of the general type characterized herein, can be used in a variety of arrangements. Typical applications include as air cleaners for internal combustion engines. The air cleaner assemblies and cartridges can be sized and configured for a wide variety of engine applications. Herein, a particular application, involving a large diesel engine having a turbocharger upstream of the air cleaner assembly, is described as an example. However, the principles disclosed herein can be applied in a wide variety of alternate applications, including for example, in air cleaners in systems that do not have a turbocharger upstream of the air cleaner.

Figure 1:
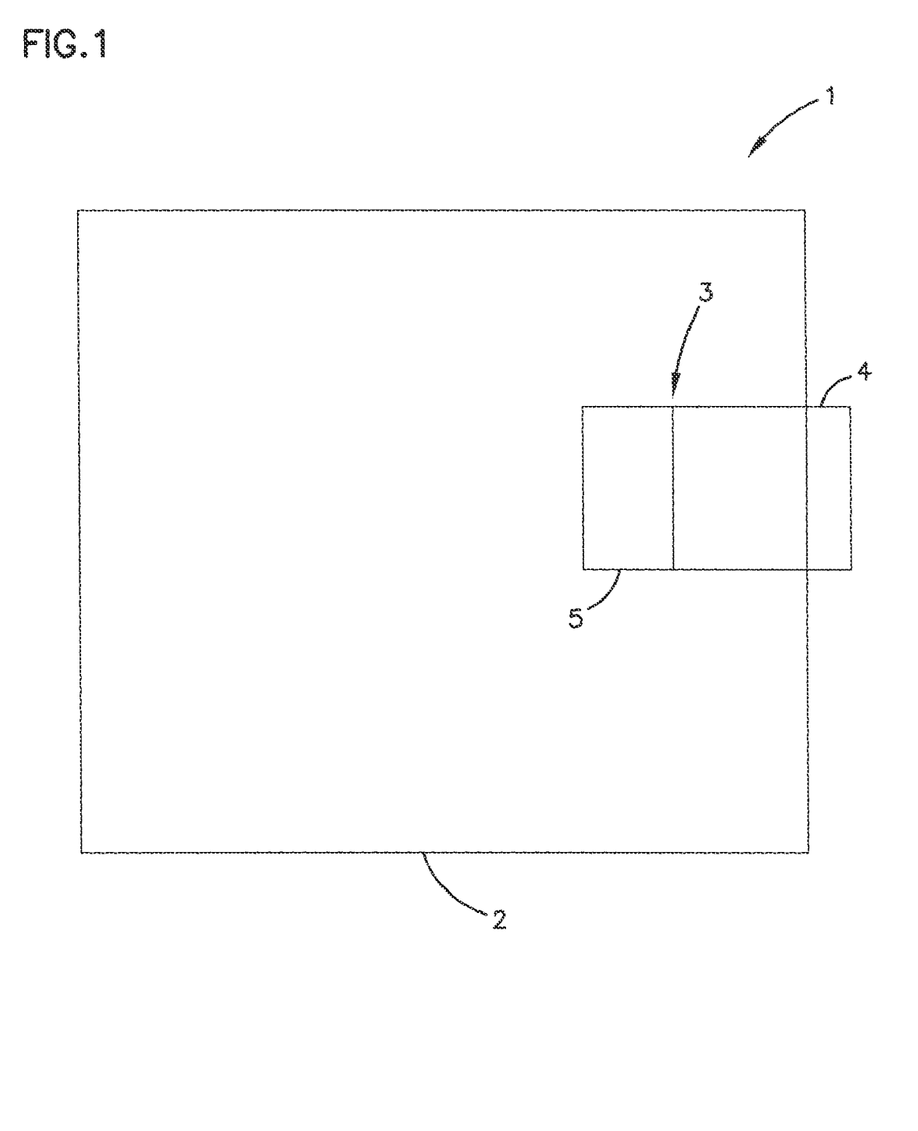
FIG. 1 is a schematic diagram of an engine system including an air cleaner arrangement according to the present disclosure.

The reference numeral 1, FIG. 1, generally indicates an engine system. The engine system 1 includes an internal combustion engine 2, such as a diesel engine, with an air intake system 3, including, among other things, a turbocharger and after cooler arrangement 4 and an air cleaner or air cleaner assembly 5. For the particular arrangement shown, the turbocharger and after cooler arrangement 4 is positioned upstream of the air cleaner 5. Thus, after passage through the turbocharger and after cooler 4, air is forced through the air cleaner 5 and into the air intake for the diesel engine 2. Large diesel engines rated at up to 750-horse power used with military vehicles, would be some typical examples of such an arrangement. The present air cleaner assembly can be used with such equipment, and thus can be operated with an internal pressure, upstream of the filter media, of (for example) 45 psi. However, the techniques can be applied in other systems also, including ones that do not have a turbocharger upstream from the air cleaner.

Figure 2:
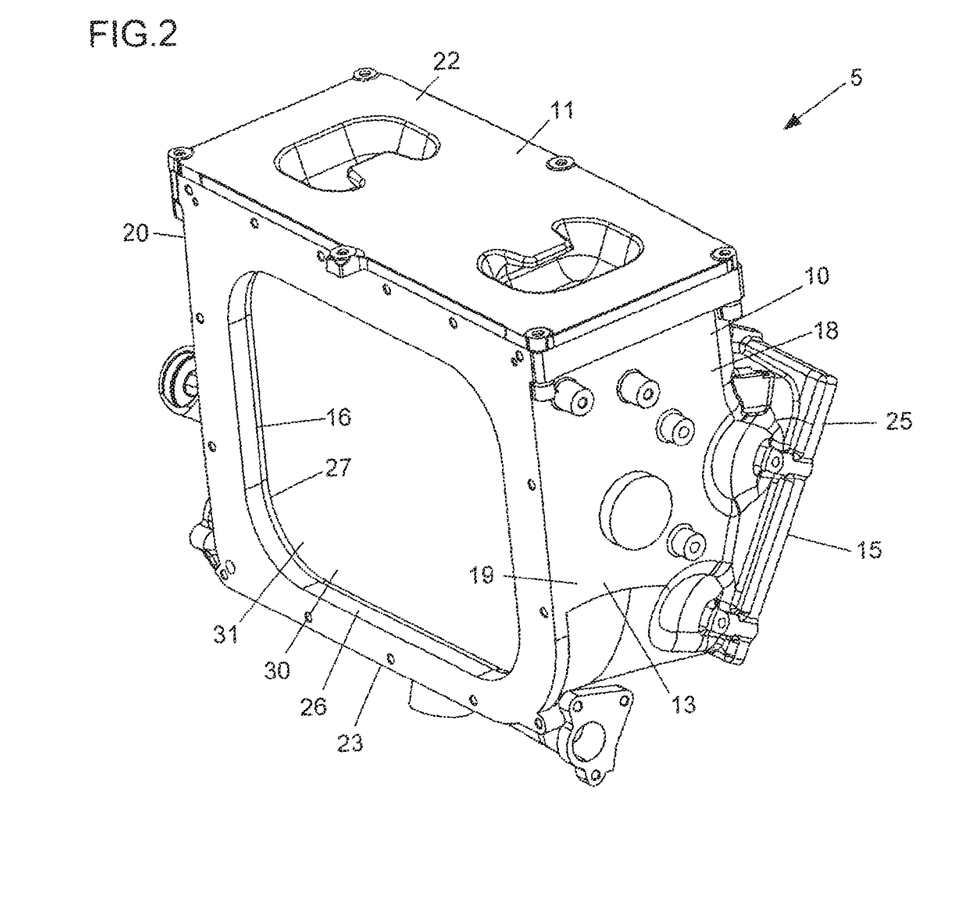
FIG. 2 is an outlet end perspective view of an air cleaner arrangement according to the present disclosure.

In FIG. 2, an air cleaner arrangement or assembly 5 according to the present disclosure is provided in perspective view. The orientation of the assembly in FIG. 2, is such that the viewer can see an exit or outlet end of the air cleaner, and an adjacent side.

Referring to FIG. 2, an outer housing 10 for the air cleaner 5 is depicted. The housing 10 is shown with removable service panel or access panel 11 mounted thereon. The housing 10 operates as a duct 13 through which, in use, air to be filtered or cleaned flows. Specifically, air to be filtered enters duct 13 through inlet end or opening 15 and, after passage through an internally received, serviceable, filter cartridge 30, the air exits the duct 13 through opposite outlet end or opening 16. In general, air cleaner operation involves passing the air, as it moves from inlet end or opening 15 to outlet opening 16, through a filter media pack 31 contained in the removable and replaceable, i.e. serviceable, filter cartridge 30.

The principles disclosed herein can be applied in a variety of shapes and sizes of housings. The particular housing 10 shown, is meant to be an example only. However, the generally rectangular (in cross-section perpendicular to air flow) configuration depicted is preferred, and the principles disclosed are particularly well adapted for application in a housing of such a preferred configuration. Of course, the preferred air cleaner and filter cartridge configurations shown are, in more general terms, non-circular (in cross-section) configurations.

The particular housing 10 (FIGS. 2 and 3) depicted has a side wall 18 defining opposite sides 19, 20, opposite top and bottom panels 22, 23, and opposite inlet and outlet ends 25, 26 respectively. Top 22 generally corresponds to a portion of the side wall which is openable by removal of the access or service cover 11. The walls 19, 20, 22, 23, 25 and 26 define an interior 27 of the housing 10, into which serviceable filter cartridge 30 is positioned, in use.

Figure 3:
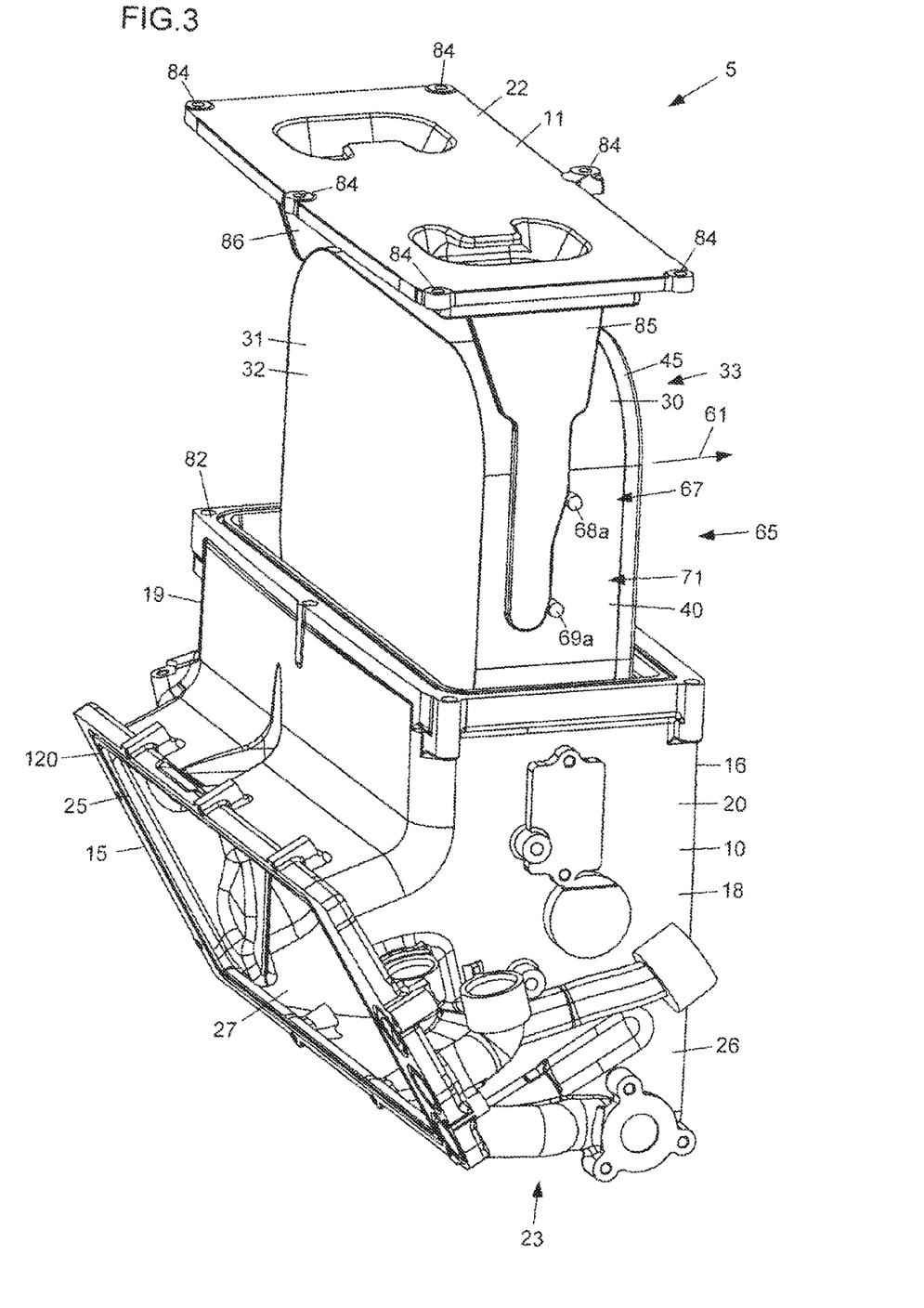
FIG. 3 is an exploded, inlet end, perspective view of the air cleaner arrangement shown in FIG. 2.

In FIG. 3 the air cleaner 5 is depicted in exploded view with access cover 11 removed. The filter cartridge 30 includes an air inlet end or face 32 and an opposite air outlet end or face 33. The filter cartridge 30 has a straight through flow design, meaning that it has opposite inlet and outlet flow faces 32, 33, respectively with (in use) air flowing therebetween. That is, the direction of inlet flow into the filter cartridge 30 and the direction of outlet flow from the filter cartridge 30 are generally the same. Referring to FIG. 3, it is noted that inlet 15 is positioned in a different plane than outlet 16. Thus for the particular arrangement 5 depicted, the inlet air flow flows through inlet 15 into housing 10 in a different cross-sectional plane than it leaves the housing 10 through outlet 16. However, with respect to flow through the filter cartridge 30, the opposite flow faces 32, 33, for the preferred arrangement shown, are parallel to one another and the flow through the cartridge 30 is generally straight. It is noted that a variety of alternatives to the particular configuration shown, can be applied still using principles according to the present disclosure.

The filter cartridge 30 includes filter media 31. The filter media 31 depicted, is of the z-filter type, comprising corrugated or fluted media secured to a non-fluted facing sheet. The facing sheet can be corrugated or non-corrugated. Such media can be provided in a variety of configurations including: as coiled continuous sheet configurations as shown schematically in FIG. 9 at 300; or, as stacked constructions of individual sheets shown schematically in FIG. 8 at 350 and described with respect to FIG. 26 of U.S. Pat. No. 5,820,646 incorporated herein by reference. Either one of these two types of z-filter media arrangements can be used to provide the configuration generally depicted in FIGS. 2-6. Indeed, the drawings of FIGS. 2-6 are schematic and are not meant to necessarily depict any specific z-filter media arrangement.

Figure 9:
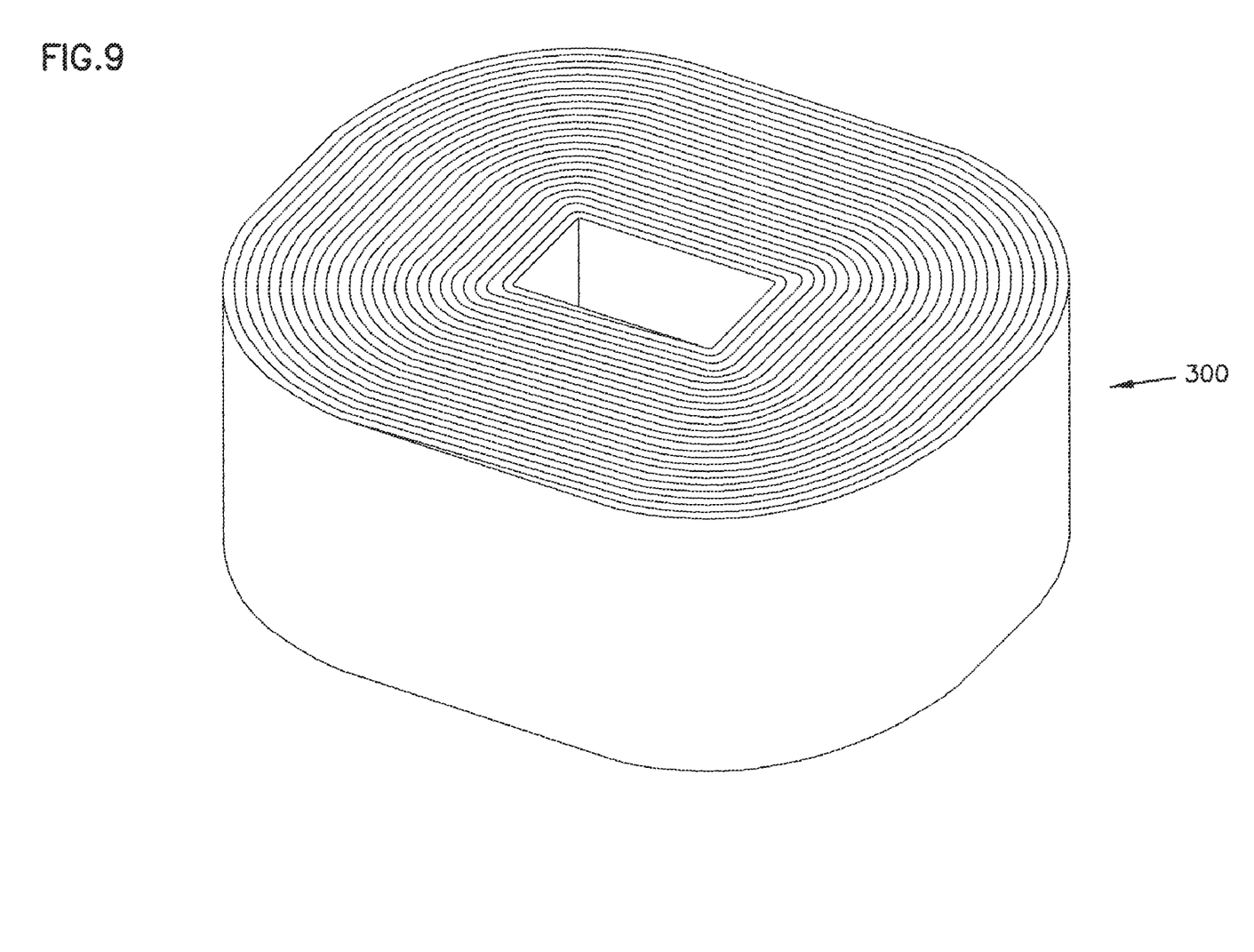
FIG. 9 is a schematic representation of a coiled z-filter media arrangement utilizing the media of FIG. 7.

It is anticipated that in a typical use such as FIGS. 2-6, a coiled configuration of z-filter media, having a perimeter shape somewhat similar to element 300, FIG. 9, will be preferable; although relative side dimensions may be modified. That is, a preferred approach would use a continuous strip of fluted or corrugated media secured to a non-fluted (preferably non-corrugated) facing media, coiled into the rectangular or square configuration shown, having: a first pair of opposite, generally parallel, sides; a second pair of opposite, generally, parallel sides; and four rounded corners. One useable type of z-filter media for this is depicted in the schematic of FIG. 7, discussed below.

Figure 4:
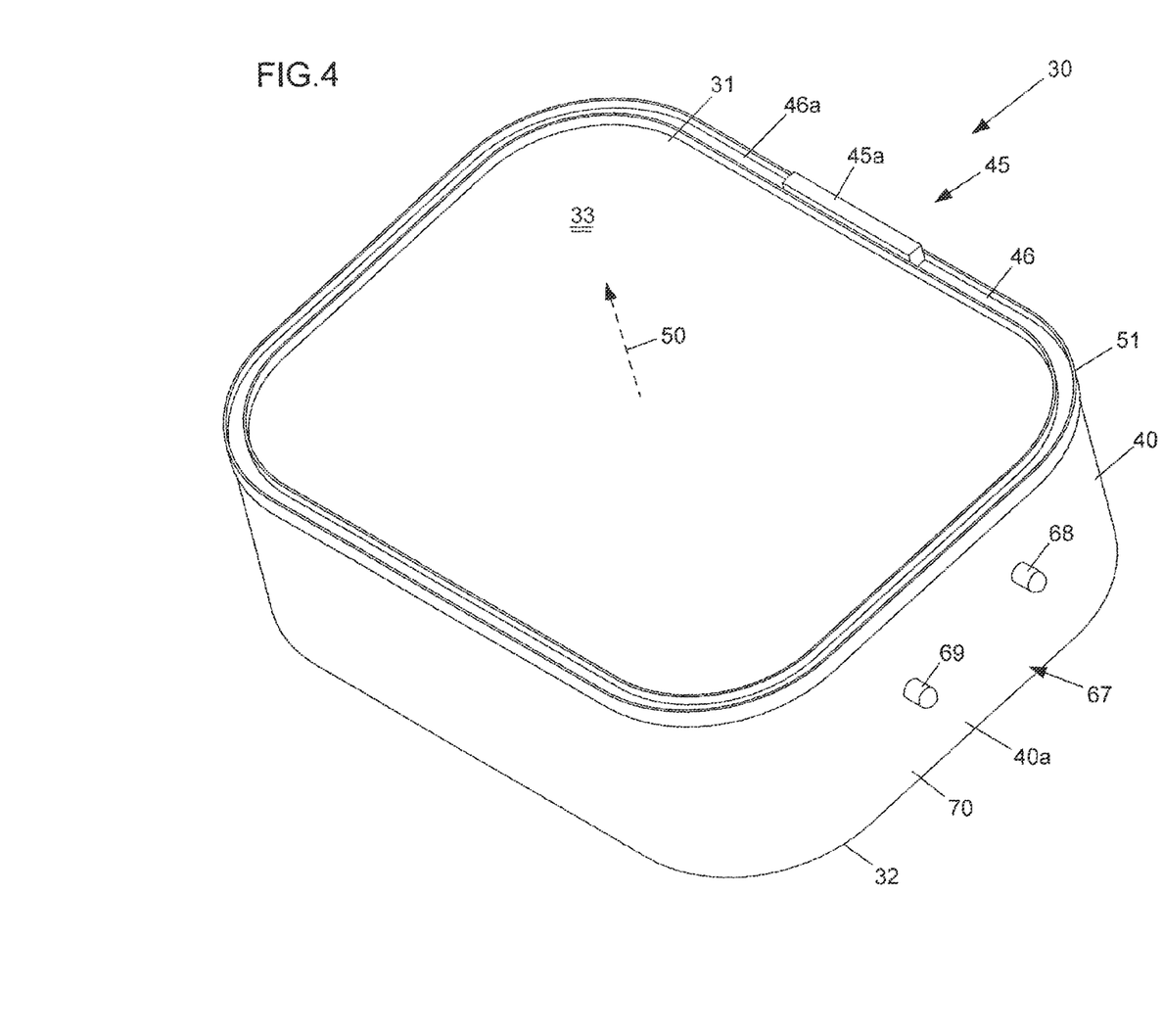
FIG. 4 is an outlet end perspective view of a filter cartridge useable in the air cleaner arrangement of FIG. 3.

Referring to FIGS. 3 and 4, the preferred filter cartridge 30 includes filter cartridge sidewall construction (or sheath construction) 40 positioned surrounding the media 31. The sidewall or sheath construction 40, is preferably impermeable, although alternatives are possible. The term "impermeable" in this context, is meant to refer to a filter cartridge sidewall or sheath construction 40 that comprises a solid, non-permeable, plastic or metal component. That is, while the air can pass from inlet end 32 to exit end 33, and thus through the length of the sidewall or sheath construction 40 between its open ends, in preferred constructions the air cannot pass directly through a side wall 40a of the sidewall or sheath construction 40.

The sidewall or sheath construction 40 can be provided in a variety of manners and by a variety of constructions. For example, it can comprise a single piece molded plastic or cast metal construction, a multi-piece clamshell construction of plastic or metal components, or a sheet or sheath of material such as aluminum wrapped around the media 31.

The sidewall or sheath construction 40 can be permanently secured to the media 31, if desired. This is preferred for the application shown. Alternatively the media 31 can be removably positioned within the sheath construction 40. The term "permanently secured" in this context, is meant to refer to a cartridge 30 in which the sidewall or sheath construction 40 and the media pack 31 are generally secured to one another and are not separated during a servicing operation. Typically securement would be with an adhesive or seal material, as appropriate. If the media pack 31 is removably positioned within the sidewall and sheath construction 40, it is expected that during a servicing operation, the sidewall or sheath construction 40 would be retained and be reused, but the media pack 31 would be replaced.

Referring to FIG. 4, at air exit or outlet end 33, the serviceable filter cartridge 30 includes a first, primary, seal arrangement 45. The first or primary seal arrangement 45 includes a seal member 45a (shown in fragmentary) positioned on framework 46 to provide a seal (i.e., a housing seal) upon appropriate engagement with a portion of the housing 10. Typically, the seal arrangement 45 comprises a seal member formed from rubber like material, such as foamed polyurethane, although alternatives are possible. In typical preferred applications, the seal member is configured to axially engage a sealing surface of the housing 10 at or adjacent an inside surface of the outlet end wall 26, FIG. 2, although alternatives are possible.

A variety of specific configurations and orientations for the seal member can be used. An example would be mounting the seal member on a portion of the impermeable sheath construction 40 itself, for example on a flange integral with a remainder of the sheath construction 40. Another example would be mounting the seal member 45a on a frame piece 51, as shown, which is itself adhered to, welded to or otherwise secured to, a remainder of the impermeable sheath construction 40. A third example would be mounting the seal member directly on the media 31; and a fourth would be mounting the seal member on a frame which is attached directly to the media 31 and not to the sheath 40.

Referring to FIG. 4, the particular filter cartridge 30 depicted is configured for the seal member 45a secured to the sheath 40, in particular secured in a groove 46a within structure 45 on the sheath 40. In FIG. 4, the seal member 45a is shown in fragmentary view. In use, it would circumscribe the flow face 33.

The seal member 45a can be permanently attached to the framework 51 or it can be removably secured thereto. An example of permanent attachment, would be a molding of the seal member, for example from a foamed polyurethane material, directly onto the framework 46 for the seal arrangement 45. Another type of permanent attachment, would be attachment with an adhesive.

If a molding operation is used to secure the seal member 45a to the framework 51, and an issue is perceived with respect to adherence of the molded seal material to the material of the framework piece 51, an arrangement can be made to provide for mechanical interlock. For example, apertures can be placed in a portion of the framework 51, allowing the moldable polymer to flow therethrough and provide for mechanical interlock after care or set, or various flange arrangements or other structures can be used to facilitate mechanical interlock.

An example of non-permanent attachment, would be a removable o-ring or similar structure positioned within groove 46.

Referring to FIG. 4, the filter cartridge 30 could be constructed to include a support lattice or framework, for example a grid pattern, positioned within cartridge 30 in extension over outlet face 31 of the media. Such grid patterns are known, see for example the U.S. Provisional applications 60/446,804 and 60/457,255 referenced above. Such grid patterns can be used, for example, to stabilize the media 31. Alternatively, the grid pattern can be secured to the housing 10.

Referring to FIG. 3, sealing of the filter cartridge 30 against the housing 10 occurs by driving the cartridge 30, in the direction of arrow 61 (once the cartridge 30 is inside the housing 10) into sealing engagement with the housing 10, at outlet end 26. As can be understood from the figures and descriptions herein, this driving or biasing is preferably conducted without rotation of the filter cartridge 30 around a central longitudinal axis projecting therethrough. A preferred biasing and lock mechanism 65, discussed below, is provided to effect this motion, although alternatives are possible. (It is noted that for the example shown, the biasing direction 61 is the same as the air flow direction. Alternatives are possible.)

Referring to FIGS. 3 and 4, attention is now directed to projection arrangement 67 positioned spaced from, air exit end 33 of the cartridge 30. The projection arrangement 67 shown generally comprises first and second projections 68 and 69 respectively positioned on a side 70 of sheath construction 40. Preferably on side 71, as mirror images of projections 68, 69, a second pair of projections 68a, 69a are positioned (FIG. 3). These projections 68, 69 are positioned to be engaged by a portion of the biasing and lock mechanism 65 as described below.

For the particular arrangement depicted, the projections 68, 69 (68a, 69a) are pins generally circular in cross-section, although alternate configurations can be used. It is noted that pin 68 is located closer to outlet face 33 than is pin 69 (similarly pin 68a is closer to outlet face 33 than is pin 69a). Advantage from this will be understood from descriptions below.

Herein projections 68, 69 will sometimes be referred to as having different axial spacing from end 33 or seal arrangement 45. The term "axial spacing" in this context is meant to refer to an axial distance from the face 33 or seal arrangement 45. The indication of "difference," is simply meant to indicate the two projections, 68, 69, have a different amount of spacing from face 33 or seal arrangement 46. A similar mirror image arrangement would be case for projections 68a, 69a.

In addition, projections 68, 69 are sometimes referenced herein as having different "vertical" spacing. Here reference is meant to the orientation of FIG. 3 from which, it can be seen, that in typical use, projection 69a is below projection 68a.

The particular number of projections from each side, is not critical. Utilization of two projections from side 70 and side 71 is convenient, although alternatives are possible. Indeed in some arrangements a single projection from each side may be used. However, the preferred arrangement 30 includes two spaced pins, as shown.

Preferably the vertical spacing between the pins 68 and 69 (or 68a and 69a) on one side, is at least 20% of the length of that associated side of the cartridge, for example pins 68 and 69 are preferably spaced apart vertically by a distance corresponding to at least 20% of the length of side 70. Most preferably the spacing is at least 30% of the length of the associated side.

Referring to FIG. 3, the preferred biasing and lock mechanism 65 includes biasing and lock projections 85, 86 attached to access cover 11. Each projection 85, 86 is preferably permanently secured to the panel 11; and, for example, if panel 11 is molded, projections 85, 86 can be made integral with panel 11.

Figure 5:
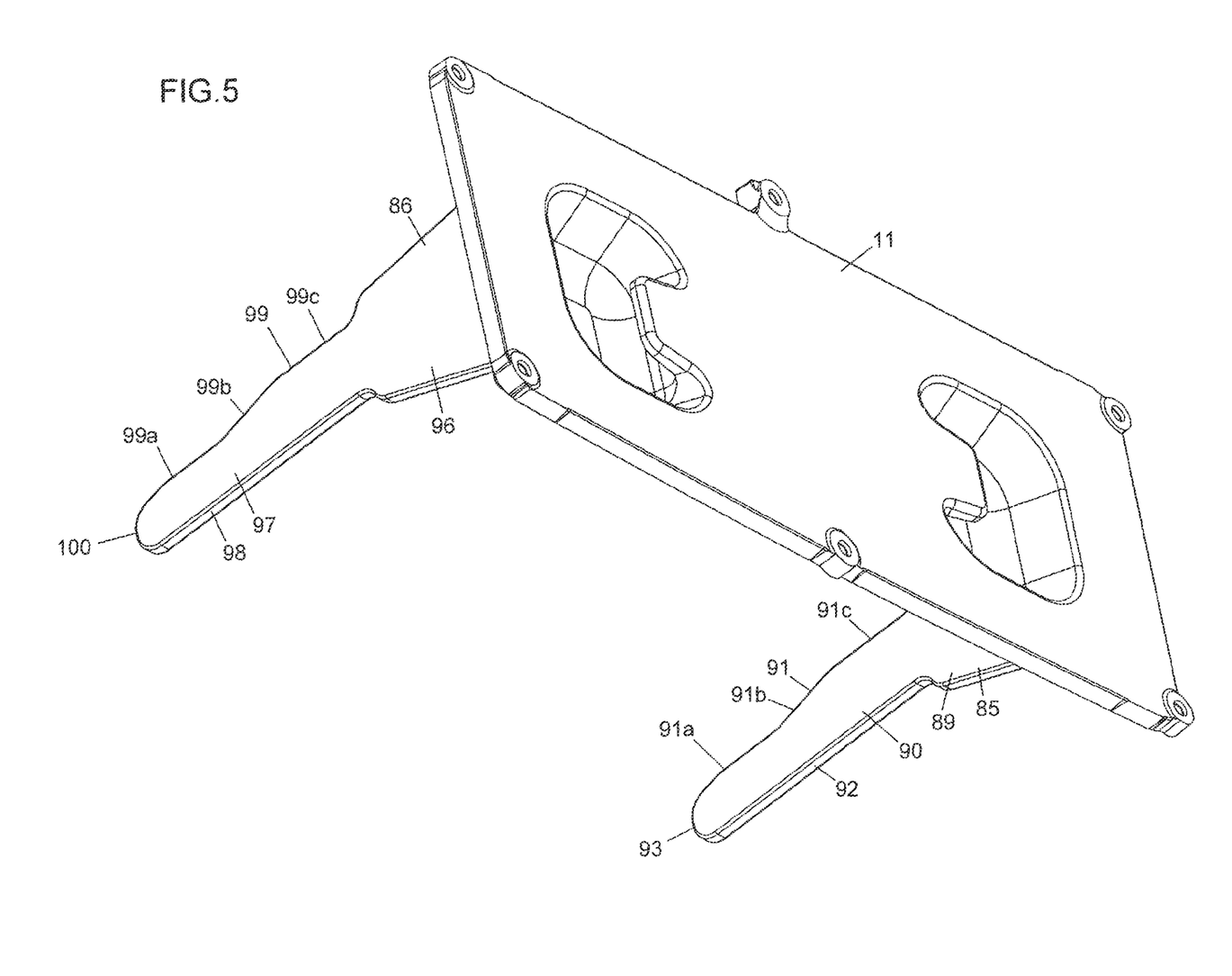
FIG. 5 is a perspective view of an access cover and biasing arrangement component of the air cleaner arrangement of FIGS. 2 and 3.

Referring to FIG. 5, projection 85 includes a base 89 and depending biasing and lock blade 90; the blade 90 extending away from cover 11. The blade 90 has opposite front edge 91 and rear edge 92 and a tip 93. Tip 93, for the particular arrangement shown, is curved. The blade 90 is preferably oriented such that it is in a plane generally perpendicular to a cross section of the filter cartridge 30, taken perpendicular to air flow, during use.

In this context, the term "front" in reference to "front edge 91" or in an analogous context, is meant to refer to an edge which faces projections 68, 69 (or 68a, 69a) of cartridge 30, during use. The term "rear edge" is meant to refer to an oppositely directed edge.

Rear edge 92 is preferably straight (linear) and is preferably directed perpendicularly to a cross section (across air flow direction) of housing 10. Front edge 91, positioned oppositely of edge 92, is preferably contoured and not straight (linear), in this instance having edge sections 91a, 91b and 91c. For the arrangement shown, sections 91a and 91c are straight (linear) and generally define lines parallel to one another and substantially parallel to edge 92, whereas section 91b is a transition section extending between sections 91c and 91a; section 91b having curved ends to join sections 91a, 91c, and a straight center non-parallel to edge 92. Section 91b can be viewed as a ramp section. Edge section 91c is spaced further from edge 92 than is edge section 91a. In some instances, sections 91a and 91c can be angled slightly forwardly, toward end 16, in extension upwardly toward base 89, to cause some cam effect.

Blade 86 is similarly constructed and is positioned on cover 11 as a mirror image to blade 85. Thus edge 86 includes base 96. Blade 97 has opposite edges 98 and 99 and tip 100, with edge 98 being preferably straight and perpendicular to air flow, and with edge 99 being opposite edge 98 and generally having a contoured shape, in this instance with three sections 99a, 99b and 99c corresponding generally to sections 91a, 91b, and 91c of blade 90, respectively. The blades 85, 86 are generally spaced apart from one another a distance such that a filter cartridge 30, FIG. 3, can be positioned or fit therebetween, when the access cover 11 is positioned in the housing 10.

Herein, contoured edges 91, 99 of the blade 90, 97 will sometimes be referred to as the filter cartridge engagement edges. The filter cartridge engagement edges 91, 99 will sometimes be characterized as having a shape which allows for a biasing action, to move the cartridge 30 toward a seal position, as the cover 11 is put in position. The preferred shape shown tends to increase the biasing, as the cover 11 is positioned. This shape, sometimes referenced as a contoured shape, generally refers to a non-linear overall shape which will bias, axially, the cartridge 30 as the blade is slid along a portion of the cartridge 30. Preferably the contoured edges 91, 99 include upper sections (91c, 99c) which are positioned axially toward the outlet end 33, and seal arrangement 45, at least 0.25 cm further than other, lower, sections (91a, 99a). Herein, the term "upper" in this context referring to the orientation of FIG. 3.

Thus, preferably the blades 90, 97 have front edges 91, 99 shaped for preferred biasing engagement with the filter cartridge 30.

Preferably opposite edges of the blades, in this instance 92, 98, which are directed toward the inlet end of the air cleaner 10, are straight and non-contoured. However alternate configurations for these edges can be used.

Of course a reverse orientation could be used, if it was decided that the seal of the filter cartridge should be against the upstream end, instead of the downstream end, of the housing.

It is noted that is some embodiments it may be desirable to put a second seal on the cartridge 40 at an opposite end from the seal arrangement 45, analogously to what was done in some of the arrangements of U.S. Provisionals 60/446,804 and 60/457,255 referenced above.

Operation of the biasing and lock mechanism 65 can be understood by reference to FIG. 3. Assume, referring to FIG. 3, that the access cover 11 has been removed from a remainder of the housing 10, and the cartridge 30 is positioned in the housing 10 in the general orientation shown (exploded) in FIG. 3. Pin 68a is closer to edge 16 of the housing 10, than is pin 69a. A similar orientation will be found with respect to pin 68 and 69, along an opposite side 70 for the cartridge 30, from the side 71 which is viewable.

After the cartridge 30 is positioned in place, the access cover 11 would be applied to the remainder of the housing 10, with blade projection 85, 86, extending downwardly into an interior of the housing 10. The contoured edges of the blades 90, 97, respectively, would be directed toward the projection arrangement 67. As the contoured edge 99 is passed (slid) along first the pin 68a and then along the pin 69a (and the corresponding pins 68, 67 on the opposite side of the cartridge 30 are encountered by edge 91), the cartridge 30 will be biased axially in the general direction of arrow 61, and into sealing engagement against a portion of the housing 10. The opposite straight edges 98, 92, FIG. 5, can be positioned to engage structure within the housing 10, to help press cartridge 30 in the direction of arrow 61, and maintain the cartridge 30 in the sealing position, as a result. Hence, the structures 85, 86 on the access cover 11 act as a biasing and lock arrangement 65 for the cartridge 30.

Figure 6:
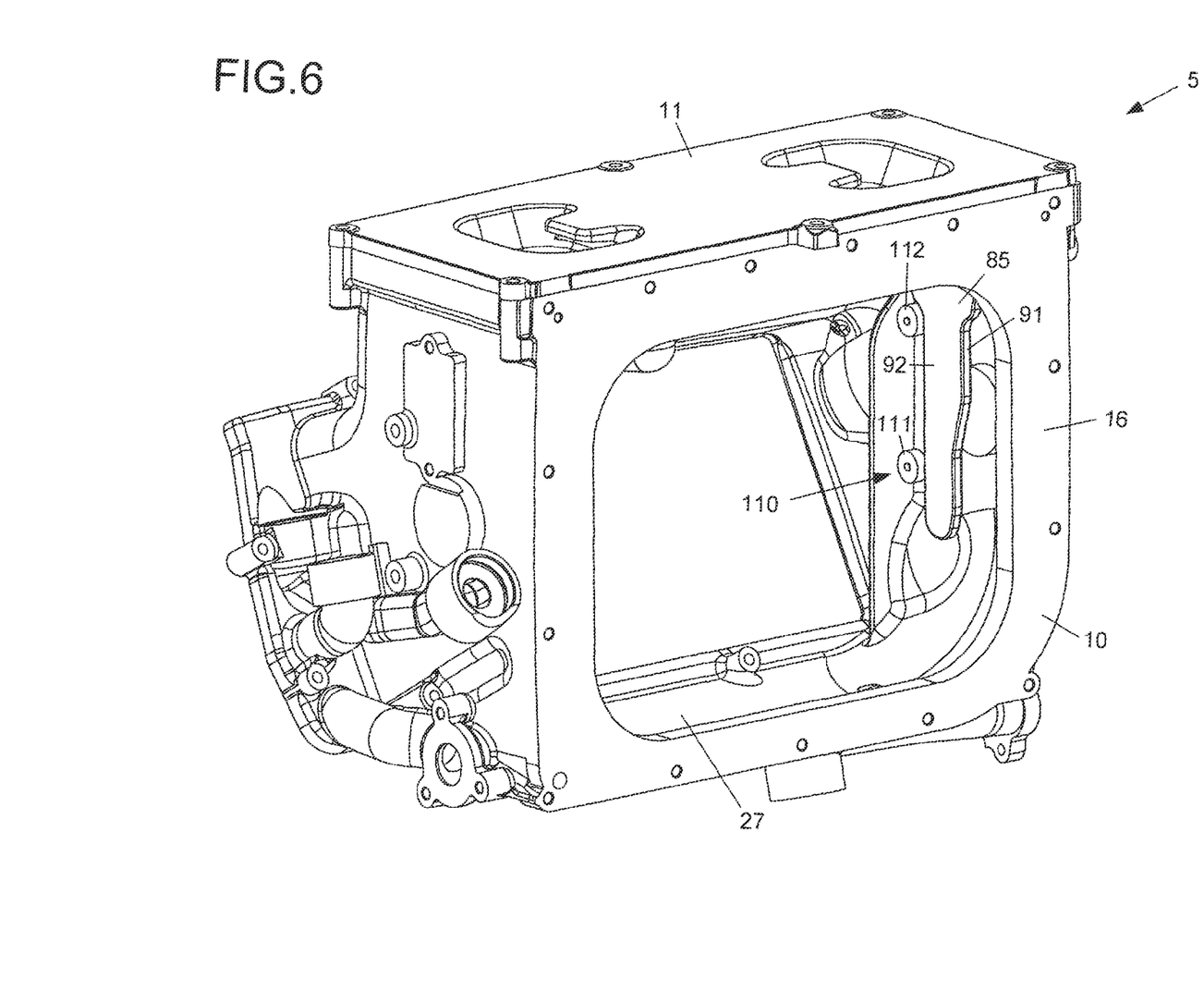
FIG. 6 is an outlet end perspective view of an air cleaner housing for the air cleaner of FIGS. 2 and 3, depicted without a filter cartridge component positioned therein.
Figure 7:
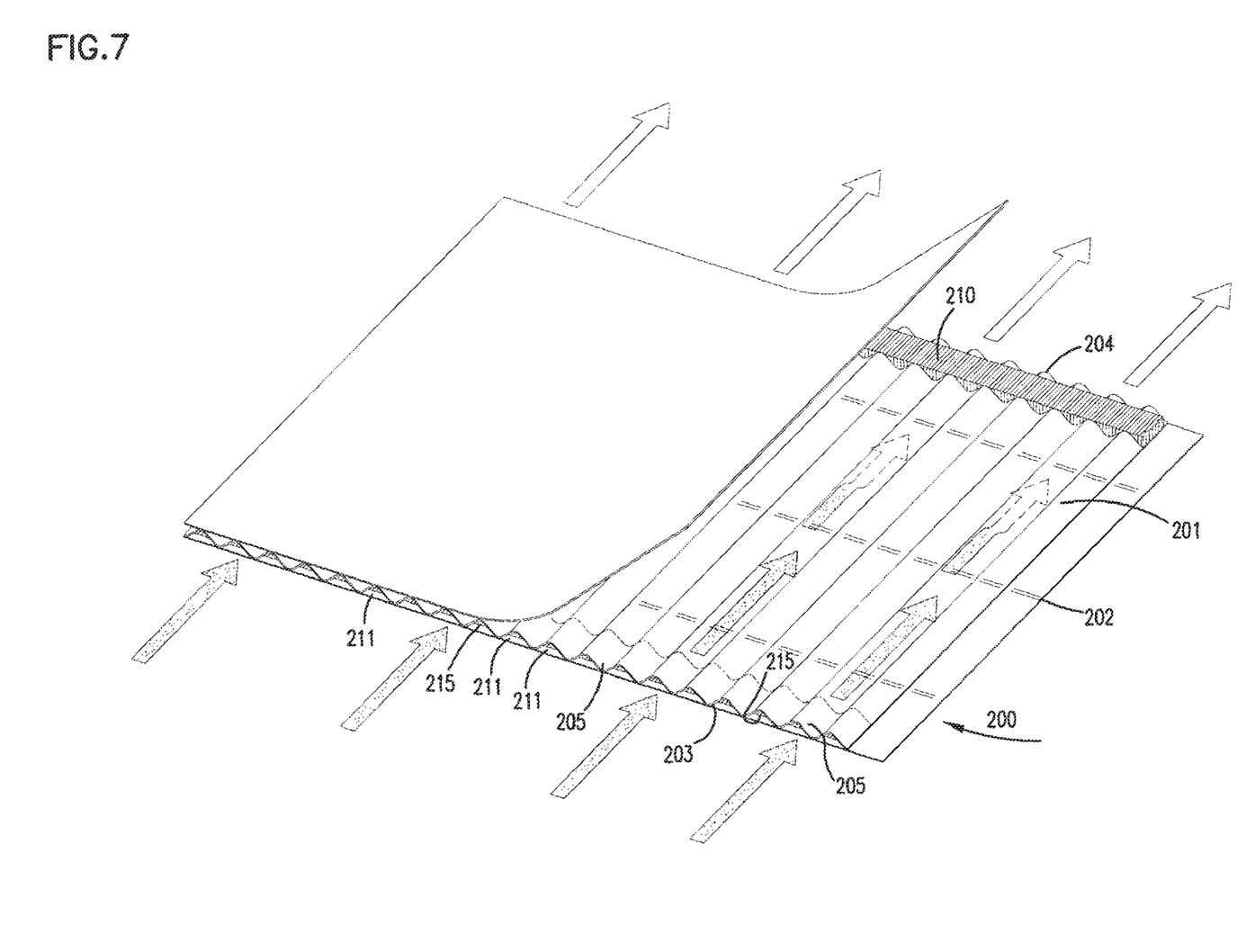
FIG. 7 is a schematic view of z-filter media utilizable in arrangements according to FIGS. 2-6.

With respect to this, attention is directed to FIG. 6 in which the housing 10 is viewable from an orientation toward the outlet end 16, with the cartridge 30 not in position. Along the interior 27 of the housing, the projection 85 can be viewed, with contoured edge 91 directed toward the air outlet 16 and with the straight edge 92 oppositely directed. Note that the straight edge 92 is positioned to engage projection arrangement 110 on the housing, in this instance the projection arrangement 110 comprising stays, projections or pins 111 and 112. The pins 111 and 112 can be provided with rollers, if desired, for convenience with respect to wear. Otherwise the pins 111, 112 may be fixed pins. An analogous structure would be present for the opposite blade 86, FIG. 5.

The cartridge 30 can be provided with a handle, not shown, thereon, for convenient handling if desired. It is anticipated that typically the cartridge 30 will be positioned within the housing interior 27 before the access panel 11 is attached. However, the access panel 11 and cartridge 10 can be positioned simultaneously, if desired.

It is noted that the projections 68 and 69 can be provided and secured in a variety of matters, including by adhesive attachment, welding or by mechanical connection or other means as appropriate for the particular materials selected. Also, they can be molded or be cast integrally with, and as a portion of, the sheath 40. When separately made, the projections 68, 69 can be constructed from a moldable material such as a hard plastic, or they can be manufactured from metal.

The particular configurations of the projections 68, 69 shown in FIGS. 3 and 4 are examples and are not required. The shape shown is convenient; however a variety of alternate shapes are usable.

In FIG. 3, underneath top 22 or access panel 11, the housing 10 includes a seal groove 82 therein, to provide for sealing, with an o-ring, between the top 22 and a remainder of the housing 10. Typically, the top 22 or access panel 11 will be mounted by bolts or similar constructions, and receivers for those bolts are shown at 84.

The housing outlet end 26, FIG. 6, can be provided with groove (not shown) therein for receiving a seal member, such as an o-ring or gasket seal, to seal with other constructions or duct work in the system. In FIG. 3, the housing inlet end 25 is shown with groove 120 therein for receiving a seal member, such as an o-ring or gasket seal, for sealing with upstream constructions or duct work.

A variety of different seal types can be utilized for the engagement between the seal member 46 on a cartridge 30, and the seal surface at end 26 of the housing 10. The particular arrangement shown for FIGS. 2-6, is an axial seal. In general an axial seal is a seal which operates by seal pressure applied in the axial direction of the filter cartridge, i.e., a direction of a line drawn through the media 31, FIG. 4, in a direction generally parallel with the side wall arrangement 40, as shown at arrow 50.

Figure 10:
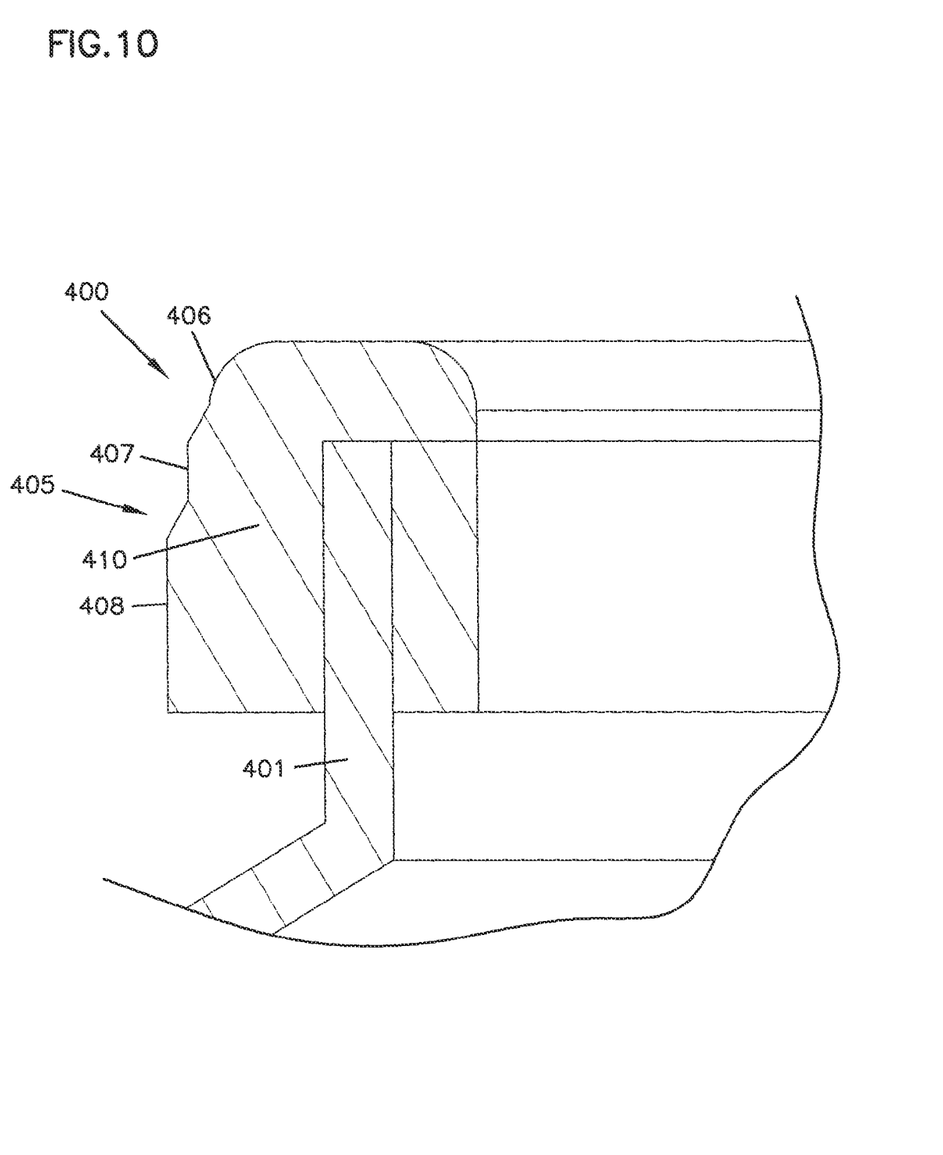
FIG. 10 is an enlarged, fragmentary, cross-sectional view of an alternate seal member to the arrangement of FIGS. 2-6.
Figure 11:
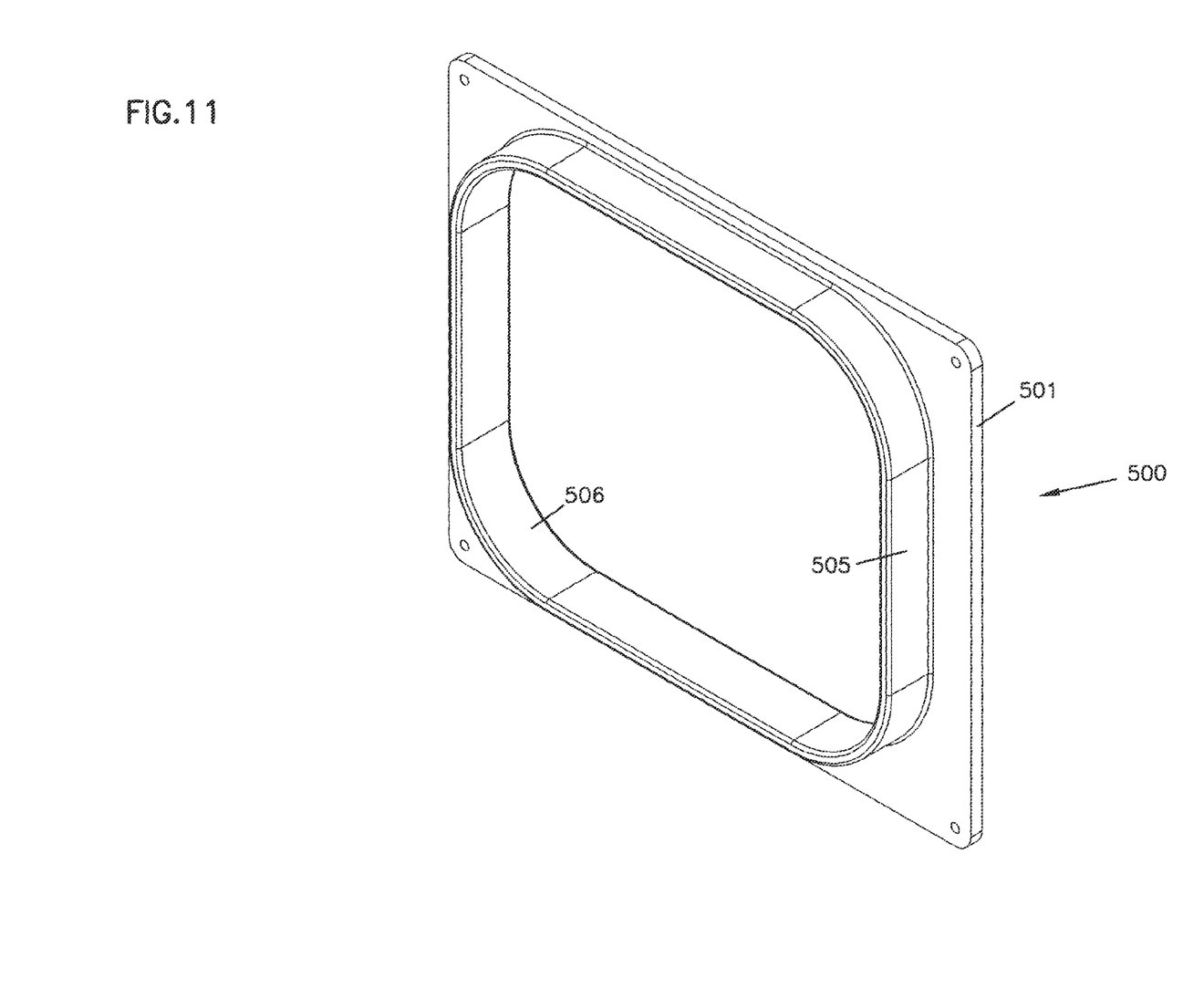
FIG. 11 is a perspective view of a rigid seal structure mountable on a housing and usable with a seal member of the element of FIG. 10.

Alternates, discussed below in connection with FIGS. 10 and 11, are possible. The type of seal discussed in connection with FIGS. 10 and 11, is a radial seal.

The axial seal may be made from a compressible foam material, for example Durometer Shore A 12-30, that will reduce in thickness when compressed axially. It may alternatively be made from a harder rubber-like material, such as a solid rubber o-ring. Typically it would be preferred that the seal member be compressible and that it compress at least 0.3 mm in thickness, and typically more, when used. This will allow for a convenient sealing.

Referring to FIG. 4, the particular filter cartridge 30 has a generally rectangular or square cross-section, with four curved corners and two pairs of straight sides, although alternates can be used.

Attention is now directed to FIG. 7. In FIG. 7 a fragmentary, schematic, view of z-filter media is shown. The media 200 includes a fluted sheet 201 secured to a non-fluted sheet 202. The non-fluted sheet 202, may be corrugated, but it is not shown that way. The upstream end or edge is indicated at 203 and the downstream end or edge at 204. Flutes 205, above the corrugated sheet 201, are open at the upstream end 203, for passage of air to be filtered therein. These flutes are closed at the downstream end 204, by sealant 210. Outlet flutes are indicated underneath the corrugated sheet 201 at 211, closed at the upstream end by sealant 215.

Figure 8:
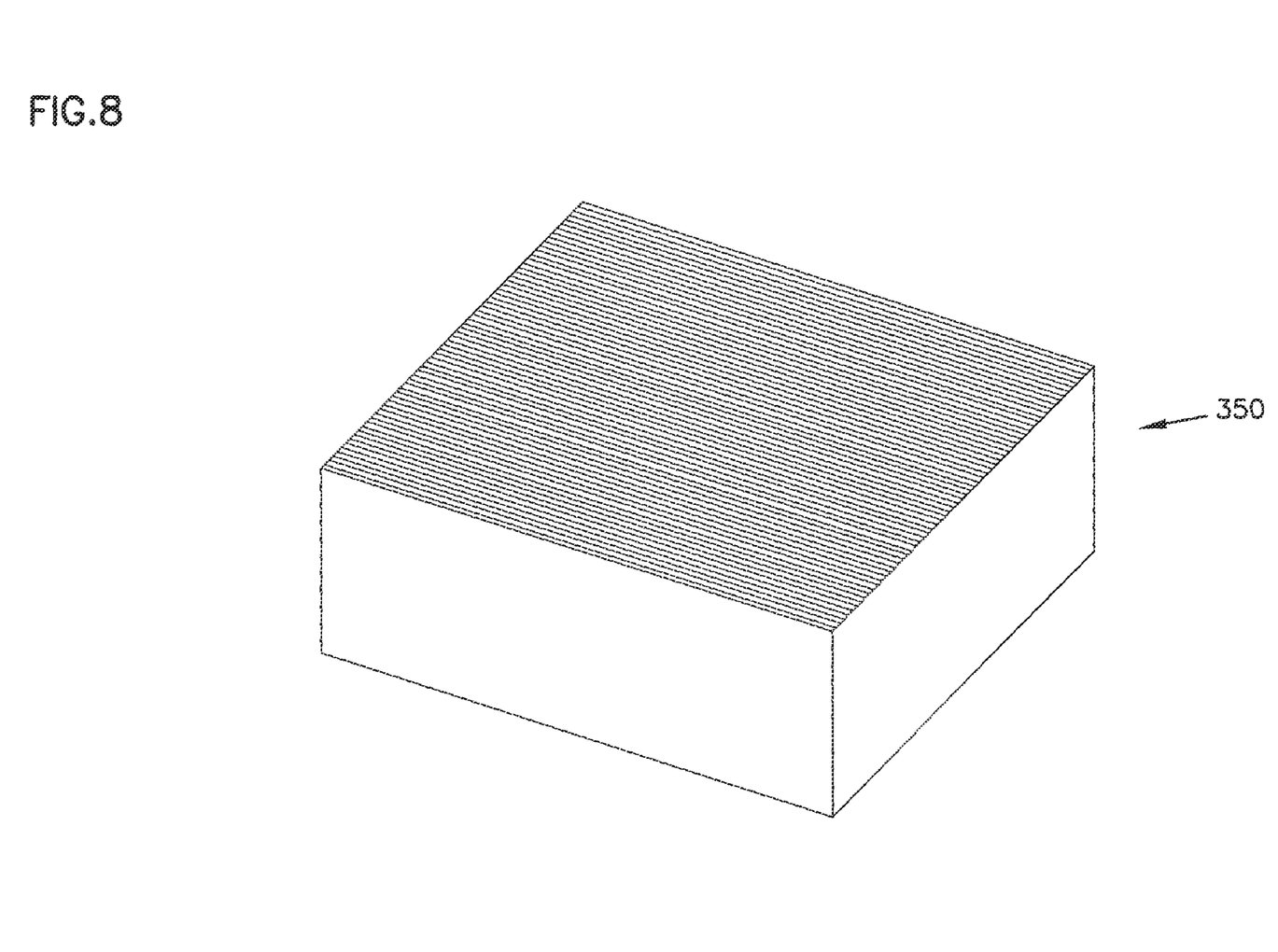
FIG. 8 is a schematic view of a stacked z-filter media arrangement utilizing the media FIG. 7.

Media shown in FIG. 7, can be cut in strips and stacked, to create a stacked arrangement 350 such as shown in FIG. 8. Alternatively, the media can be coiled into a coiled shape 300 (as shown schematically in FIG. 9).

Those ends of the flutes which are closed, are shown in FIG. 7 as closed by sealant beads. Alternates are possible, for example the ends can be folded, crushed or otherwise distorted, for closure.

A variety of alternate z-filter media configurations to that shown in FIG. 7 can be used. For example tapered flutes in accord with the disclosure of PCT Publication WO 97/40918, can be utilized. Alternatively, flutes which are folded closed at one or more ends in accord with the disclosures of U.S. Provisional 60/395,009 and the PCT Application filed Jan. 31, 2003 and incorporated herein, above, by reference, can be used.

The media may comprise a variety of materials. The particular media choice would depend upon the particular application of use involved. Typically non-woven fibrous constructions, comprising cellulose fibers, synthetic fibers or mixtures of the two, would be used. In some instances a surface application, such as a fine fiber application, can be used for preferred efficiency.

II. An Alternate (Radial) Seal Approach

FIGS. 10 and 11

Alternately to the axial seal approach described above in connection with FIGS. 2-6, a radial seal approach can be used as demonstrated in FIGS. 10 and 11. Referring to FIG. 10, a seal member 400 is shown positioned on structure 401. The structure 401, for example, can be positioned as part of the filter cartridge 30, for example as part of the side wall 40. The seal member 400 includes a sealing surface 405 in this instance having sections or steps 406, 407, 408. In region 410, the seal material 400 will compress in thickness, radially, as the seal member 400 is pushed into an annular portion of a related housing, for use. Arrangements which operate in this manner are sometimes referred to as "radial seals," since the compression direction of the seal is radial with respect to a central axis 50 (FIG. 4) of the filter cartridge.

The particular radial seal depicted in FIG. 10, is an outside radial seal, since it will be directed outwardly from central axis 50, FIG. 4. An inside radial seal, or oppositely directed radial seal, can also be used.

In FIG. 11, flange 500 securable to a housing, to allow for a radial seal, is shown. The flange 500 includes attachment portion 501 and seal member surface with opposite sides 505 and 506. Surface 505 is positioned for receiving an inside radial seal. Surface 506 is positioned for receiving an outside radial seal. Structure 500 can be mounted at the outlet end of housing 10, for example, if the filter cartridge 30 includes a radial seal arrangement analogous to arrangement 400. Alternatively, the annular surface of the housing, for sealing, can be provided integral with a remainder of the housing.

Radial seal arrangements are described in detail, for example, in the two provisional applications 60/446,804 and 60/457,255, identified above and incorporated herein by reference. The techniques for radial sealing described therein, can be used for the arrangements described herein.

III. Concluding Observations

From the above detailed descriptions, a general understanding of certain preferred principles presented herein is understood. It is noted that the principles can be used together, to form a preferred air cleaner. However selected ones of the principles can be used in various alternate arrangements, if desired.

Among the principles disclosed, is a biasing and lock arrangement which utilizes two depending blades, at opposite sides of a filter cartridge, with an edge of each blade being contoured, instead of simply straight; preferably in the shape shown. The contouring can be used to provide an advantageous biasing to a cartridge member, during positioning of the blades. Preferably a rear end of the blades is straight, and is positioned to engage projections permanently mounted in the housing, for convenience.

A preferred arrangement of contouring is shown, which utilizes two straight sections separated by a third section. The two straight sections are preferably axially spaced, with respect to one another, within the air cleaner. Also, the two straight sections are preferably such as to define lines parallel to one another.

A preferred filter cartridge arrangement is also described. The filter cartridge arrangement generally includes a z-filter media pack surrounded by a sidewall construction. Preferably the sidewall construction has a generally rectangular or square shape, with rounded corners, although alternatives are possible.

Projection arrangements are provided on opposite sides of the sidewall. The projection arrangements preferably comprise posts. Most preferably on each side, at least two posts are spaced axially and vertically from one another, for engagement with sections of biasing and lock blades. This type of positioning can be used to not only help bias the cartridge into position for sealing and to retain it there, but also to ensure that the cartridge is properly positioned within the housing but not improperly installed.

A variety of seal arrangements for the cartridge to the housing are possible. One approach described is using an axial seal contained on the cartridge pressed against a portion of a housing sidewall, axially, in use. Alternatively radial seal approaches can be used.

In general methods of assembly and use are described. Methods of use would involve the steps of inserting the cartridges described, and then applying the biasing lock blade during closure of the air cleaner. Methods of assembly would generally involve assembling the various components, for example in the specific configurations described.

What is claimed is:

1. An air filter cartridge arrangement comprising:
   (a) a media pack having an inlet end and an opposite outlet end;
      (i) the media pack including fluted media oriented with flutes extending in a direction between the inlet end and the outlet end; and,
   (b) a sidewall arrangement having first and second sides with the media pack positioned therebetween;
      (i) the sidewall arrangement including a pair of first and second, axially and vertically spaced, projections on the first side;
         (A) axial spacing between the first and second projections comprising spacing in a direction corresponding to a direction between the inlet end and the opposite outlet end; and,
         (B) vertical spacing between the first and second projection comprising spacing in a direction corresponding to a direction perpendicular to the direction between the inlet end and the opposite outlet end; and,
      (ii) the sidewall arrangement including a pair of third and fourth, axially and vertically spaced, projections on the second side;
         (A) axial spacing between the third and fourth projections comprising spacing in a direction corresponding to a direction between the inlet end and the opposite outlet end; and,
         (B) vertical spacing between the third and fourth projections comprising spacing in a direction corresponding to a direction perpendicular to the direction between the inlet end and the opposite outlet end.

2. An air filter cartridge according to claim 1 wherein:
   (a) the first, second, third and fourth projections each have a circular cross-section.
3. An air filter cartridge according to claim 1 wherein:
   (a) the media pack comprises a plurality of inlet flutes open adjacent the inlet end and closed adjacent the outlet end; and,
   (b) the media pack comprises a plurality of outlet flutes closed adjacent the inlet end and open adjacent the outlet end.
4. An air filter cartridge according to claim 1 wherein:
   (a) the media pack comprises fluted media secured to a facing media.
5. An air filter cartridge according to claim 4 wherein:
   (a) the media pack comprises a continuous strip of fluted media secured to facing media and coiled.
6. An air filter cartridge according to claim 5 wherein:
   (a) the media pack has a rectangular configuration with: a first pair of opposite, generally parallel, sides; and, a second pair of opposite, generally parallel, sides; and, four rounded corners.
7. An air filter cartridge according to claim 6 wherein:
   (a) the sidewall arrangement surrounds the media pack.
8. An air filter cartridge according to claim 7 wherein:
   (a) the sidewall arrangement is an impermeable sheath.
9. An air filter cartridge according to claim 1 including:
   (a) a first, primary, seal arrangement.
10. An air filter cartridge according to claim 9 wherein:
    (a) the first, primary, seal arrangement comprises an axial seal.
11. An air filter cartridge according to claim 9 wherein:
    (a) the first, primary, seal arrangement comprises a radial seal.
12. An air filter cartridge according to claim 11 wherein:
    (a) the first, primary, seal arrangement is an inside radial seal.
13. An air filter cartridge according to claim 11 wherein:
    (a) the first, primary, seal arrangement is an outside radial seal.
14. An air filter cartridge according to claim 1 wherein:
    (a) the media pack comprises a stack of strips of fluted media secured to facing media.
15. An air cleaner arrangement including:
    (a) a housing having: a sidewall; an inlet end; and an outlet end;
       (i) the housing sidewall including an access cover removable from a remainder of the housing; and,
    (b) an air filter cartridge comprising:
       (i) a media pack having an inlet end and an opposite outlet end;
          (A) the media pack including fluted media oriented with flutes extending in a direction between the inlet and outlet ends of the media pack; and,
       (ii) a sidewall arrangement having first and second sides with the media pack positioned therebetween;
          (A) a sidewall arrangement including a pair of first and second, axially and vertically spaced, projections on the first side;
             (1) axial spacing between the first and second projections comprising spacing in a direction corresponding to a direction between the inlet end and opposite outlet end of the media pack; and,
             (2) vertical spacing between the first and second projections comprising spacing in a direction corresponding to a direction perpendicular to the direction between the inlet end and the opposite outlet end of the media pack; and, (B) the sidewall arrangement including a pair of third and fourth, axially and vertically spaced, projections on the second side;
  (1) axial spacing between the third and fourth projections comprising spacing in a direction corresponding to a direction between the inlet end and opposite outlet end of the media pack; and,
  (2) vertical spacing between the third and fourth projections comprising spacing in a direction corresponding to a direction perpendicular to the direction between the inlet end and the opposite outlet end of the media pack; and,
(c) first and second biasing and lock blades secured to the access cover and projecting along opposite sides of the air filter cartridge;
  (i) the air filter cartridge being removably positioned in the housing;
  (ii) the first biasing and lock blade having a non-straight, contoured, forward edge in engagement with the first and second projections; and,
  (iii) the second biasing and lock blade having a non-straight, contoured, forward edge in engagement with the third and fourth projections; and,
  (iv) the forward edges of the biasing and lock blades engaging the filter cartridge to secure the filter cartridge in a sealing orientation.

16. An air cleaner arrangement according to claim 15 wherein:
(a) the first biasing and lock blade has a straight, rear, edge opposite the contoured front edge; and
(b) the second biasing and lock blade has a straight, rear, edge opposite the contoured front edge;
(c) the straight rear edges of the first and second biasing and lock arrangement being in contact with posts positioned on the housing sidewall and inside the housing.

17. An engine intake system comprising:
(a) an engine
(b) a turbocharger; and,
(c) an air cleaner arrangement positioned downstream from the turbocharger; the air cleaner arrangement comprising;
  (i) a housing having: a sidewall; an inlet end and an outlet end;
    (A) the housing sidewall including an access cover removable from a remainder of the housing; and,
  (ii) an air filter cartridge comprising:
    (A) a media pack having an inlet end and an opposite outlet end;
      (1) the media pack including fluted media oriented with flutes extending in a direction between the inlet and outlet ends of the media pack; and,
    (B) a sidewall arrangement having first and second sides with the media pack positioned therebetween;
      (1) the sidewall arrangement including a pair of first and second, axially and vertically spaced, projections an the first side;
        axial spacing between the first and second projections comprising spacing in a direction corresponding to a direction between the inlet end and opposite outlet end of the media pack; and, vertical spacing between the first and second projections comprising spacing in a direction corresponding to a direction perpendicular to the direction between the inlet end and the opposite outlet end of the media pack; and,
      (2) the sidewall arrangement including a pair of third and fourth, axially and vertically spaced, projections an the second side;
        axial spacing between the third and fourth projections comprising spacing in a direction corresponding to a direction between the inlet end and opposite outlet end of the media pack; and, vertical spacing between the third and fourth projections comprising spacing in a direction corresponding to a direction perpendicular to the direction between the inlet end and the opposite outlet end of the media pack.

* * * * *